United States Patent [19]

Jungbauer et al.

[11] Patent Number: 5,405,552
[45] Date of Patent: Apr. 11, 1995

[54] MODIFIED POLYSUGAR AS THE ALIGNMENT LAYER FOR LIQUID-CRYSTAL DISPLAYS

[75] Inventors: Dietmar Jungbauer, Darmstadt; Norbert Rösch; Javier Manero, both of Frankfurt am Main, all of Germany

[73] Assignee: Hoechst Aktiengesellschaft, Frankfurt am Main, Germany

[21] Appl. No.: 103,916

[22] Filed: Aug. 9, 1993

[30] Foreign Application Priority Data

Aug. 11, 1992 [DE] Germany .................. 42 26 556.8

[51] Int. Cl.$^6$ ............... C09K 19/56; C09K 19/52; G02F 1/13
[52] U.S. Cl. ............... 252/299.4; 252/299.01; 359/75; 359/76
[58] Field of Search ............. 252/299.01, 299.4; 359/76, 75

[56] References Cited

U.S. PATENT DOCUMENTS

| | | | |
|---|---|---|---|
| 5,167,856 | 12/1992 | Harada et al. | 252/299.01 |
| 5,178,792 | 1/1993 | Harada et al. | 252/299.6 |
| 5,206,751 | 4/1993 | Escher et al. | 359/100 |
| 5,250,215 | 10/1993 | Magerstädt et al. | 252/299.5 |

FOREIGN PATENT DOCUMENTS 63-070227 3/1988 Japan .

*Primary Examiner*—Shean Wu
*Attorney, Agent, or Firm*—Curtis, Morris & Safford

[57] ABSTRACT

Modified polysugar as an alignment layer for liquid-crystal displays

An alignment layer for liquid-crystal displays (LCDs) contains
- a) at least one oligomer/polymer of a 6-membered cyclic sugar unit all or some of whose free OH groups may be derivatized and which carries equatorial substituents in the 2-, 3- and 6-positions on the ring, and
- b) at least one compound from the group consisting of macrocyclic compounds, cryptands, coronands, podands, mercapto compounds and ionophores.

LCDs which contain an alignment layer according to the invention are particularly distinguished by good contrast and bright-transmission values and by good alignment of the liquid crystal.

9 Claims, No Drawings

MODIFIED POLYSUGAR AS THE ALIGNMENT LAYER FOR LIQUID-CRYSTAL DISPLAYS

BACKGROUND OF THE INVENTION

Switching and display devices which contain liquid-crystal mixtures have been used widely for years. Liquid-crystal displays (LCDs) are devices which, as a consequence of electrical switching, modify their optical transmission properties in such a way that incident—and possibly re-reflected—light is modulated in intensity. Examples are the known watch and calculator displays or liquid-crystal displays in the OA (office automation) or TV sectors.

These LCDs—also known as LC cells—are constructed in such a way that a liquid-crystal layer is enclosed on both sides by layers which are usually, in the sequence starting from the LC layer, at least one alignment layer, electrodes and a limiting plate (substrate). In addition, they contain one polarizer if they are operated in guest-host or reflective mode, or two polarizers if the transmissive birefringence mode is used. The switching and display elements may contain further auxiliary layers, such as diffusion barrier or insulation layers.

The interaction of the liquid-crystal molecules with the wall surfaces offers an important method of controlling the basic alignment of the LC molecules throughout the cell. In a similar way as a molecule is aligned with its neighbor within a liquid-crystal film by interactions, vessel walls can have an aligning effect on the liquid-crystalline phases. The nature and pretreatment of the cell surfaces causes the molecules of a liquid-crystalline phase to be aligned with the long axes parallel (homogeneous), perpendicular (homeotropic) or tilted to the limiting surfaces.

The special limiting surfaces which cause the alignment of the LC molecules are known as alignment layers.

Such alignment layers are described, for example, by J. Cognard (MCCC, Supplement 1, 1982) for nematic liquid crystals and by J. S. Patel et al. (Ferroelectrics 59 (1984) 137) for smectic liquid crystals. Several problems occur in the alignment of ferroelectric liquid crystals compared with nematic ones. Firstly, the aim is to obtain a uniform layer structure, and secondly the two switching states of the molecules must be well stabilized, since they are different from the alignment direction.

Two important parameters of LC displays which are highly dependent on the alignment layers used are
a) the maximum brightness (transmission in the bright state),
b) the maximum contrast (ratio between the maximum transmission in the bright state and the maximum transmission in the dark state);
both are described in greater detail for the case of ferroelectric liquid crystals (FLCs):
a) The maximum transmission in the bright state $T_{bright}$ is described to a good approximation for FLC displays, as is known, by equation (1):

$$T_{bright} = \sin^2(\pi \Delta n d / \lambda) \cdot \sin^2(4\theta_{eff}) \qquad (1)$$

where $\Delta n$ = difference between the refractive indices (uniaxial approximation), d = thickness of the FLC layer, $\lambda$ = vacuum wavelength and $\theta_{eff}$ = effective tilt angle. In the ideal case, $T_{bright} = 1$ (or 100 %). Whereas the first of the two terms in equation (1) can be optimized relatively easily by matching $\Delta n$ and d to the wavelength of visible light, the material-side optimization of $\sin^2(4\theta_{eff})$ causes problems since $\theta_{eff}$ is generally very much smaller than 22.5 ° ( the optimum value ).

b) The contrast is the ratio between transmissions in the bright and dark switching states. At present, maximum contrast values of from 5 to 10 are specified for FLC displays. The reason for these values, which are too low for many applications, for example TV, lies both in an inadequate bright transmission and in an excessively high residual transmission in the dark switching state. The residual transmission is easily detectable between crossed polarizers from a liquid-crystal structure which appears bluish.

Numerous inorganic and organic materials have already been disclosed for use in alignment layers. Very good results, particularly with respect to bright transmission and contrast, are achieved by means of silicon monoxide vapor-deposited obliquely. However, this requires a very expensive vacuum process, which is not very suitable for industrial mass production.

Significantly less expensive are alignment layers comprising organic polymers, such as polyimides, polyamides and polyvinyl alcohol, having rubbed surfaces; however, the bright transmission and contrast of FLC displays containing such alignment layers are still clearly inadequate, so there is a considerable demand for further materials for alignment layers.

The use of cellulose and starch or derivatives thereof as a material for alignment layers has already been disclosed (for example JP-A-63/070 227, JP-A-59/149 321, JP-A-03/100 520 and JP-A-02/262 622).

Furthermore, EP-A-0 453 966 discloses that alignment layers comprising organic polymers can be modified by means of an amphiphilizating, in particular macrocyclic compounds in order to improve the properties of alignment layers.

SUMMARY OF THE INVENTION

It has now been found that oligomers and polymers of 6-membered cyclic polyhydroxyl compounds, or derivatives thereof, in which the substituents are all arranged equatorially in the 2-, 3- and 6-positions, are after modification by means of macrocyclic compounds, cryptands, coronands, podands, mercapto compounds or ionophores, a particularly suitable material for alignment layers since they produce excellent alignment of liquid-crystal molecules.

The invention therefore relates to an alignment layer for liquid-crystal displays, containing
a) at least one oligomer/polymer of a 6-membered cyclic sugar unit, some or all of whose free OH groups may be derivatized and which carries equatorial substituents in the 2-, 3- and 6-positions on the ring, and
b) at least one compound from the group consisting of macrocyclic compounds, cryptands, coronands, podands, mercapto compounds and ionophores.

LCDs which contain an alignment layer according to the invention are distinguished, in particular, by good contrast and bright-transmission values. Furthermore, the alignment layer according to the invention enables a highly stable liquid-crystal switching and display device to be produced. FLC mixtures can be converted into a uniform and twist-free bookshelf or quasi-bookshelf alignment by applying a continuous periodic electric voltage (explanation of terms: Dübal et al., Proc. 6th Intl. Symp. on Electrets, Oxford, England (1988); Y. Sato et al., Jap. J. Appl. Phys. 28, L 483 (1989)). Shock-damaged liquid-crystal displays in which alignment layers according to the invention are used can be regenerated by applying a continuous periodic voltage.

The novel alignment layer for LCDs contains at least one oligomer/polymer of a 6-membered cyclic sugar unit some or all of whose free OH groups may be derivatized and which carries equatorial substituents in the 2-, 3- and 6-positions on the ring.

Suitable substituents are hydroxyl groups, derivatized hydroxyl groups, such as ethers and esters, and groups which have been introduced into the sugar molecule by an exchange reaction for a hydroxyl group or a substituted hydroxyl group, such as halogens or amino groups.

DESCRIPTION OF THE PREFERRED EMBODIMENTS

Preference is given to oligomers/polymers of D-glucose or derivatives thereof, in particular cellulose, preferably having a molecular weight of between 50,000 and 500,000 g/mol, cellulose esters, such as cellulose acetates, cellulose butyrates, cellulose acetobutyrates, cellulose acetophthalates, cellulose acetopropionates, cellulose propionates, cellulose xanthogenates, cellulose ethers, such as methylcellulose, ethylcellulose, benzylcellulose, hydroxyethylcellulose, hydroxypropylcellulose, ethylhydroxyethylcelluloses, methylhydroxyethylcellulose, methylhydroxypropylcelluloses, methylhydroxybutylcelluloses, carboxymethylcelluloses, carboxyethylcelluloses, carboxymethylhydroxylethylcelluloses, dextrins such as acid dextrins, residual dextrins, α-, β- and γ-cyclodextrins, starches, such as amyloses having a molecular weight of from 50,000 to 150,000 g/mol and amylopectin having a molecular weight of from 300,000 to 2,000,000, and starch esters, such as starch acetates, starch citrates and starch xanthogenates.

The isolation or synthesis of these predominantly commercially available substances is known per se, and can be found, for example, in Ullmann's Encyclopedia of Industrial Chemistry, 5th edition, Weinheim 1985, and in the literature cited therein.

The modification of the polysugar employed according to the invention can be carried out by applying or linking compounds of the macrocycle, ionophore, mercapto compound, coronand, cryptand or podand type.

The modifying substances can either be bonded chemically to the alignment layer or merely applied as a strongly or weakly physisorbed layer.

The component in the display modifying the alignment layer can thus be applied as an additional layer between the alignment layer and the LC layer, but can also be added to the polysugar forming the alignment layer as a simple mixture component. A further possibility is to couple the substance to the polysugar forming the alignment layer by chemical reaction.

The active intermediate layer can be applied, for example, from a solution of the suitable compounds in acetone, toluene, cyclohexanone, isopropanol, N-methylpyrrolidone, dioxane and the like by printing, immersion, spraying and spin-coating methods and the like. Also suitable are vacuum deposition methods, such as simple vapor deposition or reactive vapor deposition methods (such as chemical vapor deposition (CVD)).

The active intermediate layer can be applied during various steps in the LC display production process, for example directly after curing or drying of the alignment layer, before the rubbing step or directly before bonding of the cell. The substances or substance mixtures can likewise be applied to the wet film of the alignment layer and cured, i.e. heated, simultaneously with the alignment layer.

It may also be advantageous to mix the active substances or substance mixtures into the polysugar solution prepared for generating the alignment layer and to apply them together with the latter in one step.

A preferred process for the production of the alignment layers according to the invention comprises 1. dissolving at least one oligomer/polymer of a 6-membered cyclic sugar unit some or all of whose free OH groups may be derivatized and which carries equatorial substituents in the 2-, 3- and 6-positions of the ring, in water or a suitable organic solvent, giving a 0.1–5 % strength by weight solution,
2. applying this solution to an ITO-coated glass substrate by means of a spin coater,
3. drying the glass substrate, preferably for from 5 minutes to 5 hours at a temperature of 80°–250° C.,
4. applying a 0.1–5% strength by weight solution of at least one compound from the group consisting of macrocyclic compounds, cryptands, coronands, podands, mercapto compounds and ionophores in a suitable organic solvent to the precoated substrate by means of a spin coater,
5. heating the coated substrate, preferably for from 5 minutes to 2 hours at a temperature between 80° C. and 250° C., after cooling
6. washing the substrate, preferably with a suitable organic solvent, and
7. rubbing the resultant modified alignment layer, preferably with a velvet-like material.

Suitable compounds for modifying the alignment layer are macrocyclic compounds, cryptands, coronands, podands, mercapto compounds and ionophoric compounds. These compounds are known per se. Synthetic procedures and further literature references are given, for example, in EP-A-0 453 966.

The active modifying compounds may in principle be monomeric, oligomeric or polymeric compounds. They generally have a moderate to highly lipophilic character with low polarity or are distinguished by the fact that the compound contains separately localized areas of relatively high and low polarity/hydrophilicity. Cyclic compounds can also have an exosphere with a somewhat lipophilic nature and an endosphere with a somewhat hydrophilic nature.

Macrocyclic compounds to be employed according to the invention are described in DE-A 4 011 804 and are reproduced here by means of the formula VI

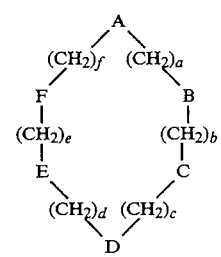

where a, b, c, d, e and f, independently of one another, are integers from zero to 4, where a+b+c+d+e+f is ≧7, and —A—, —B—, —C—, —D—, —E— and —F— are identical or different and are —CH₂—, —CHR'—, —CHOCH—, —CR=CR'—,

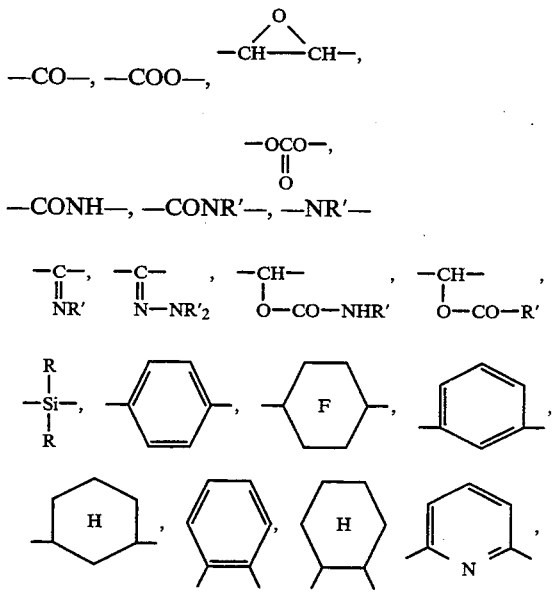

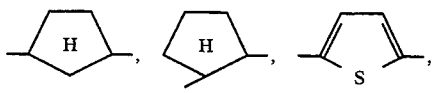

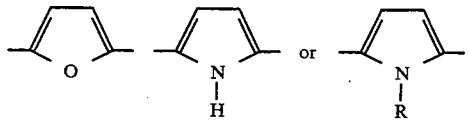

where R is alkyl having 1 to 12 carbon atoms, and R' is alkyl having 1 to 12 carbon atoms in which one —CH₂— group may be replaced by —O— or —COO—, or is phenyl or Cl, F or CN.

Cryptands and coronands, as proposed in German patent application P 4 011 803.7, "Ferroelectric liquid-crystal mixture containing cryptands and coronands", are likewise particularly suitable as amphiphilizing compounds.

For a classification of said complex ligands, reference is made to E. Weber and F. Vögtle, Inorganica ChimicaActa, Vol. 45, (1989), L65–L67. The ligand topologies listed therein are reproduced below:

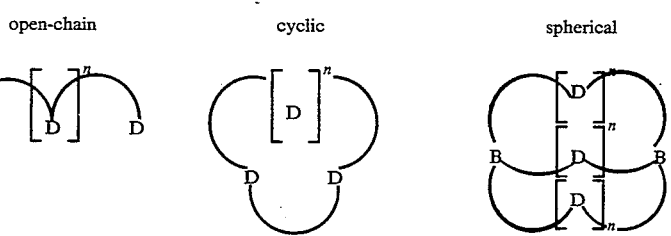

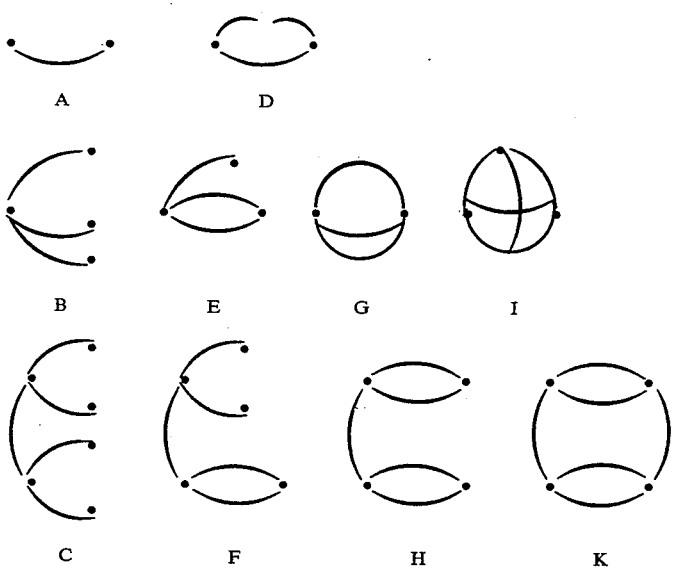

A–C: acyclic (podands); D–F: monocyclic (coronands)
G–H: bicyclic (coronands, cryptands)
I–K: tricyclic (cryptands)

The cryptands or coronands to be employed can be represented by the formula VII or VIII:

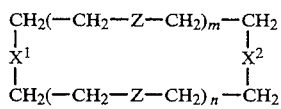 VII where
—Z— is —O— or —S—, and
m and n are integers greater than zero, where m+n =2 to 6,
—$X^1$— and —$X^2$— are identical or different and are —Z—, —NR—,

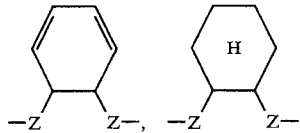

or
—$X^1$— and —$X^2$— together are
>N—$CH_2$ (—$CH_2$—Z—$CH_2$)$_l$—$CH_2$—N< or
>N—CO(—$CH_2$—Z —$CH_2$)$_l$—CO—N
where
—R is alkyl or alkanoyl having 1 to 15 carbon atoms, phenyl, benzyl or benzoyl, and l is 1 or 2;

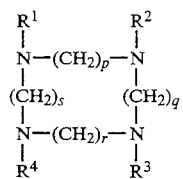 VIII where -$R^1$, -$R^2$, -$R^3$ and -$R^4$ independently of one another, are

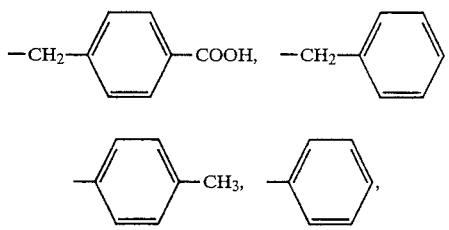

—H or —$CH_3$, and p, q, r and s, independently of one another, are an integer from 2 to 4, where p+q+r+s=8 to 16.

Preferred coronands are:

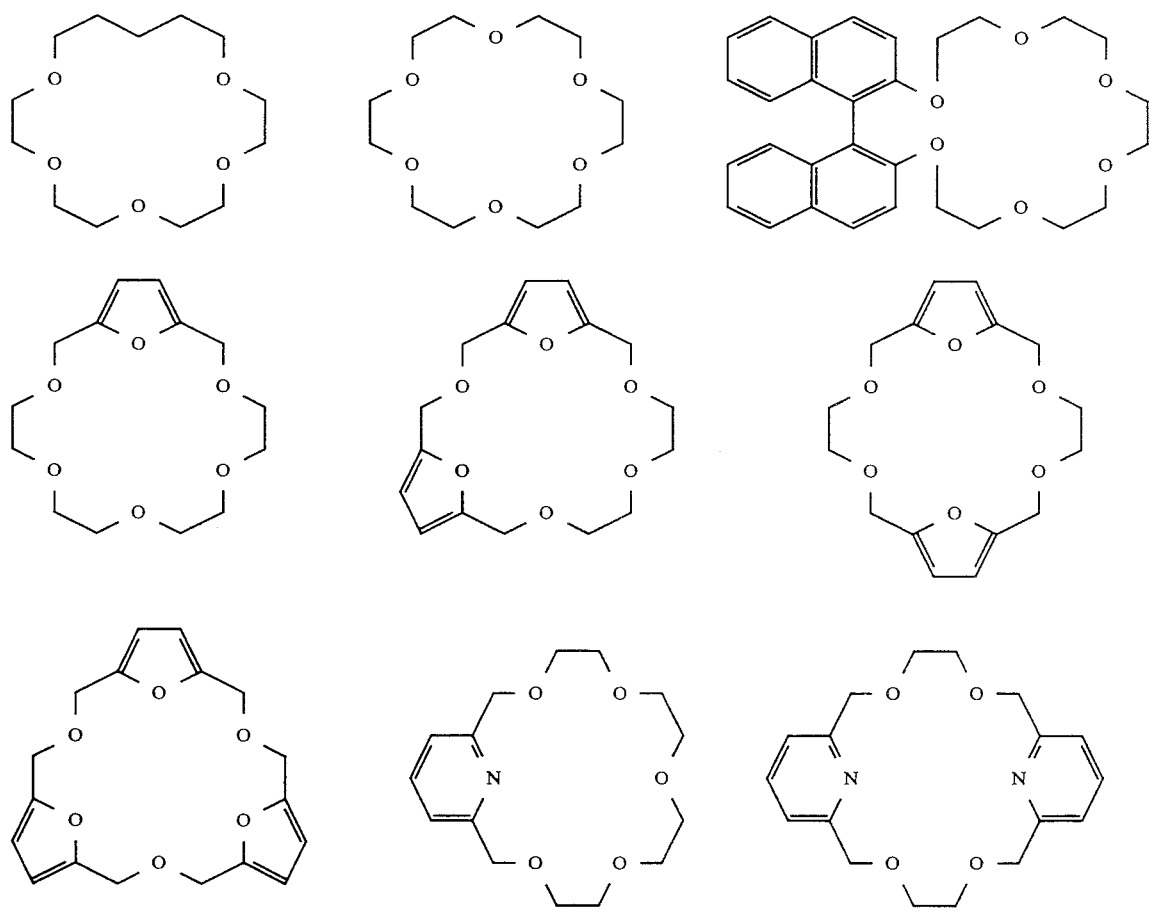

-continued
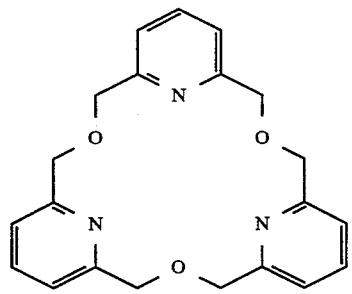 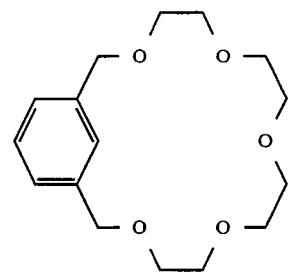 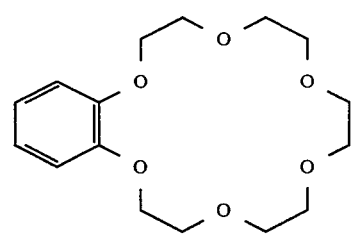
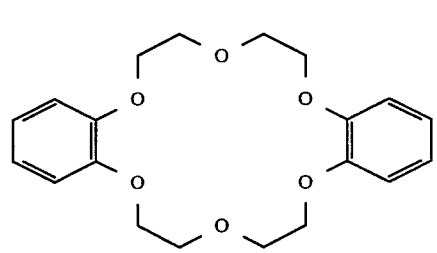 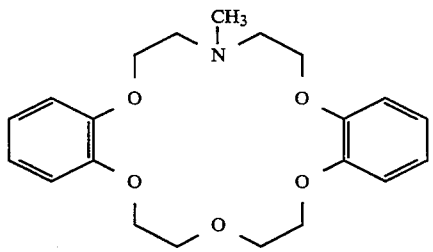
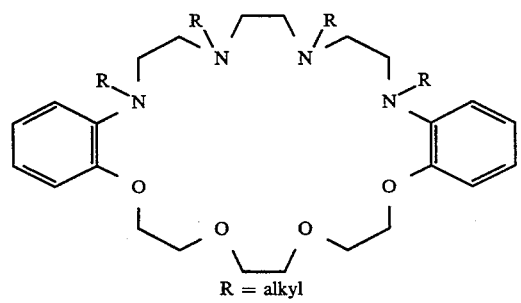 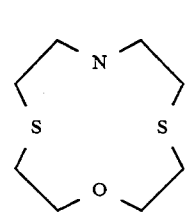 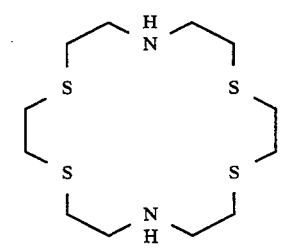
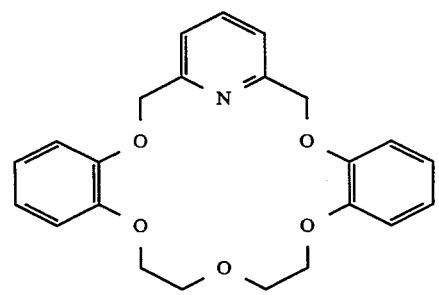 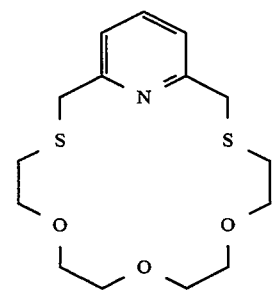 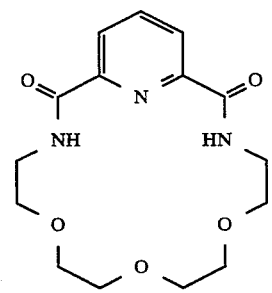
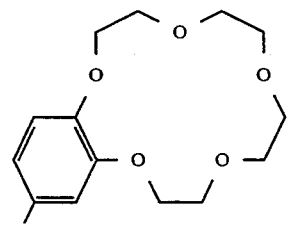

-continued
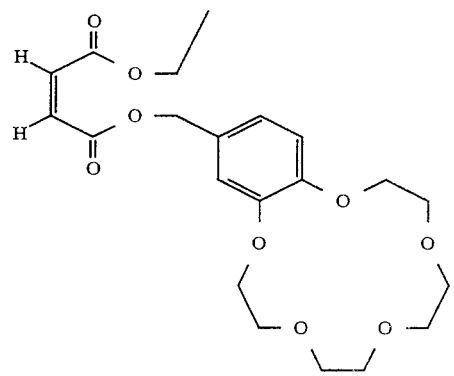
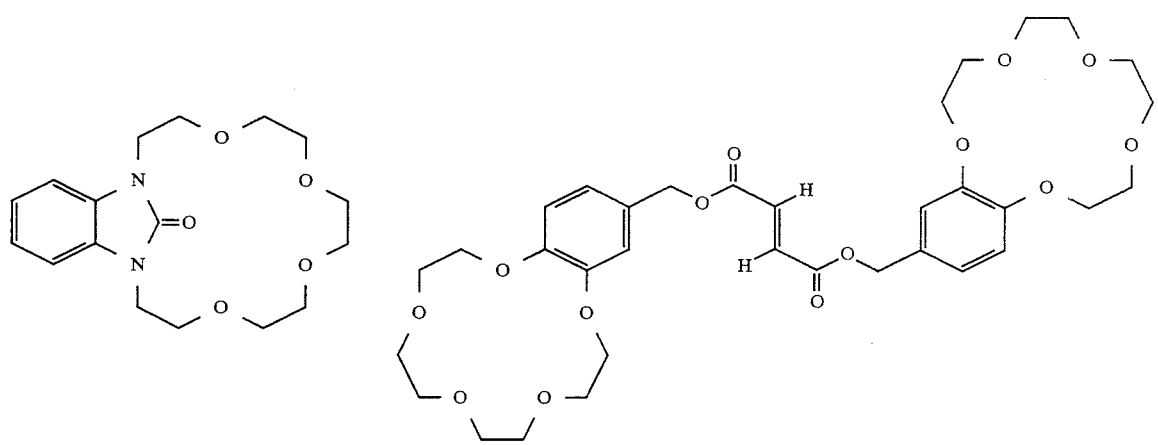
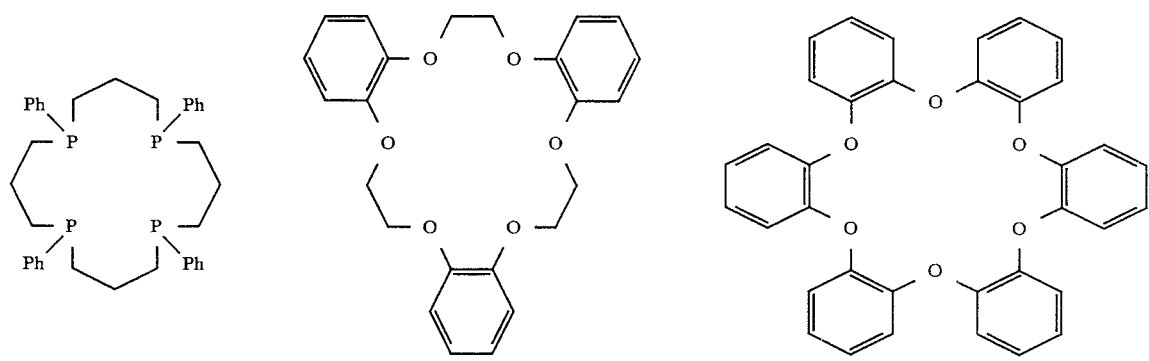
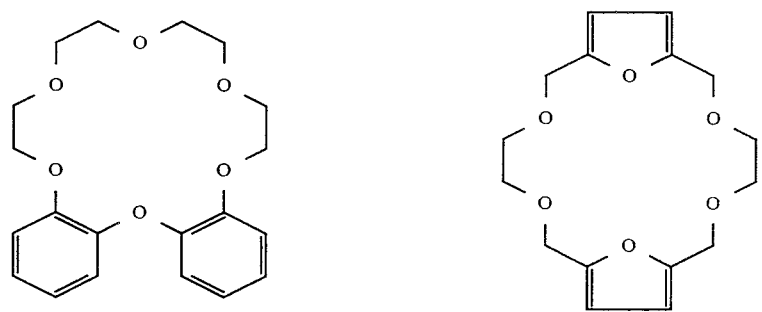

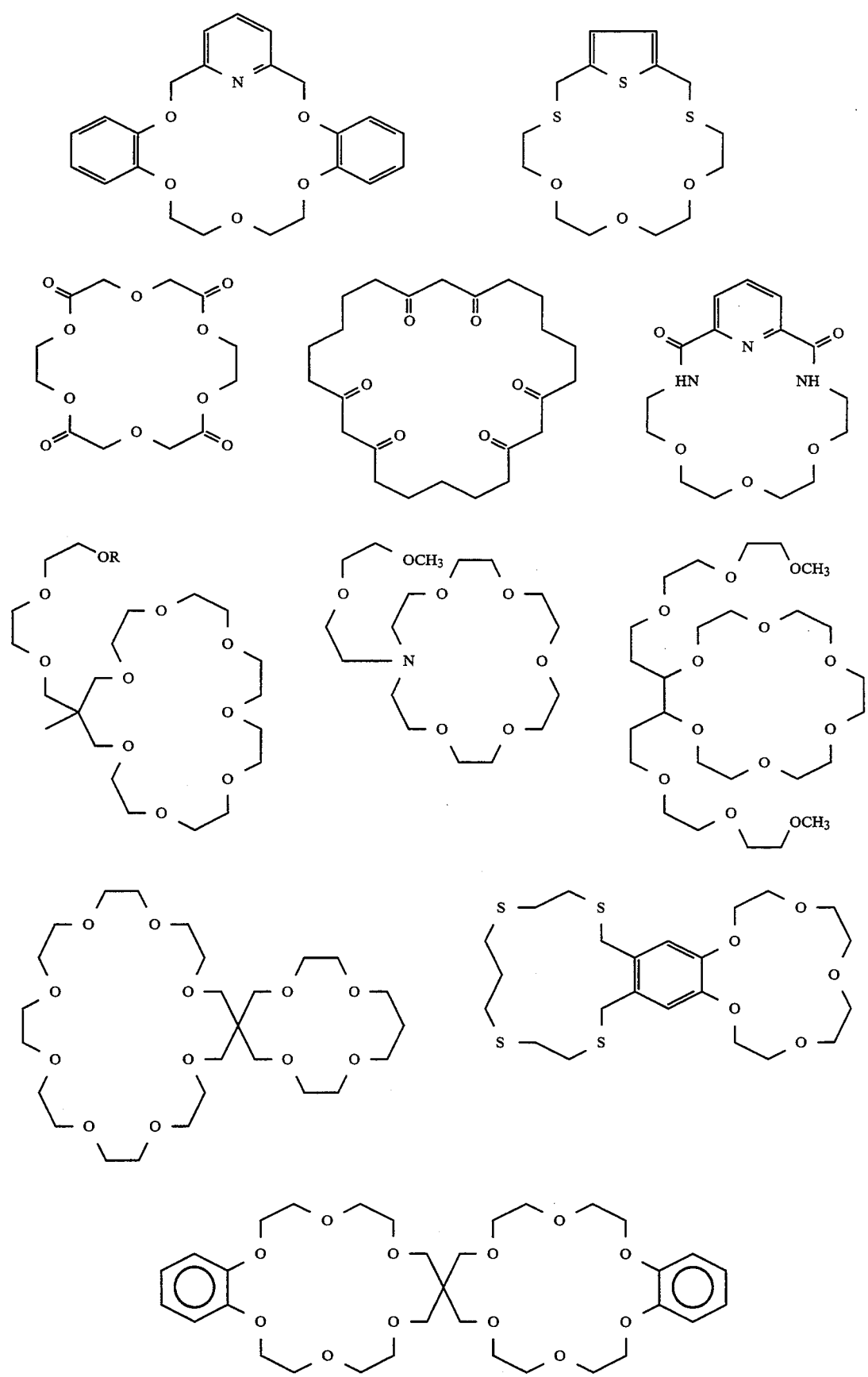

-continued
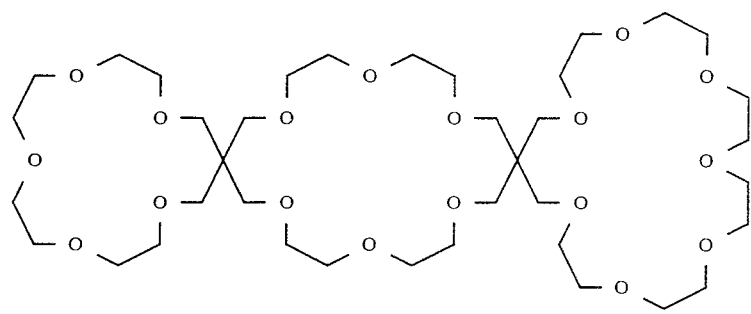
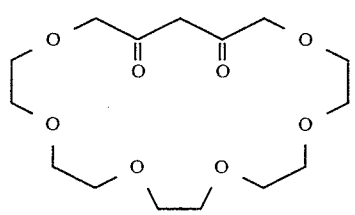
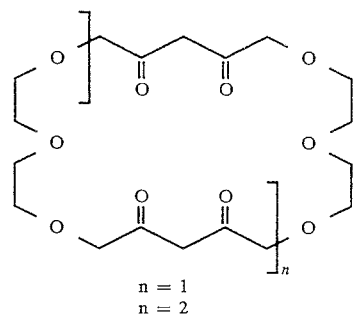
n = 1
n = 2
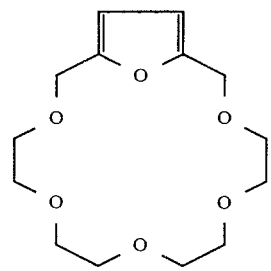
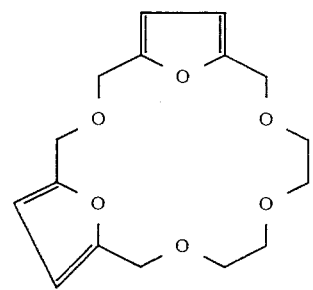
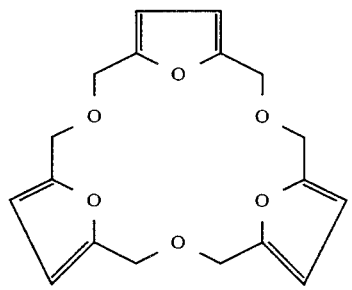
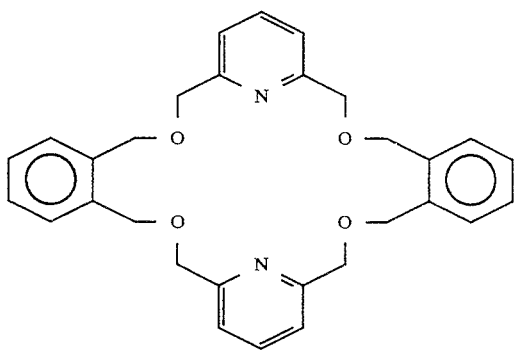
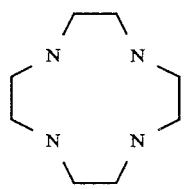
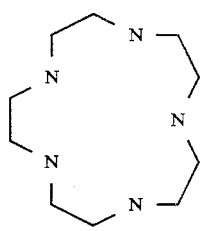
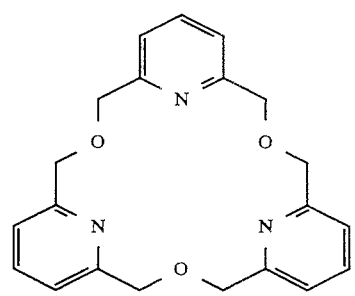

17
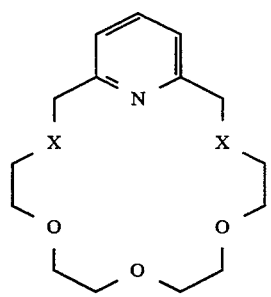
X = O
X = S
-continued
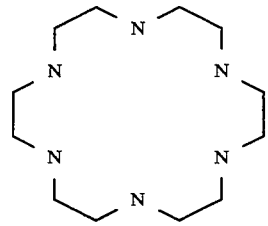
18
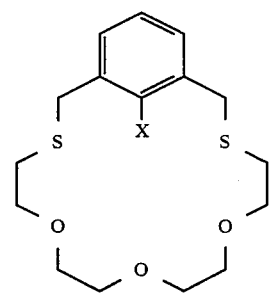
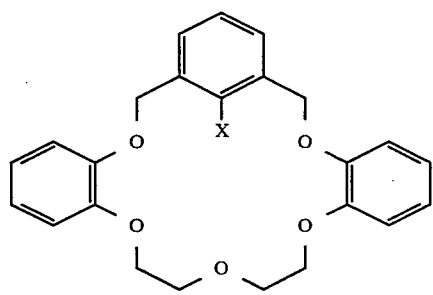
X = H  OCH₃  SCH₃  NO₂  CN  C₆H₅
COOCH₃  F  Cl
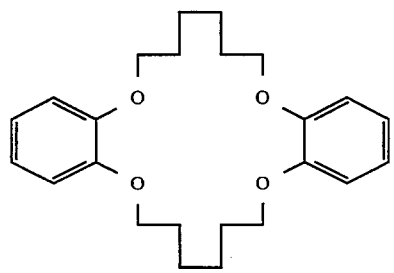
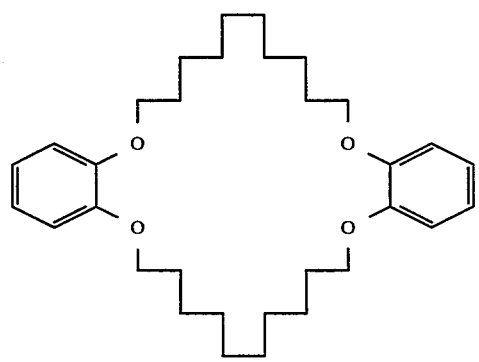
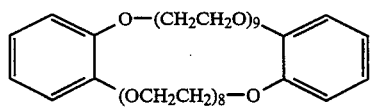
30
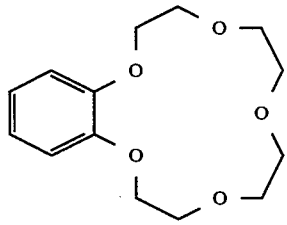
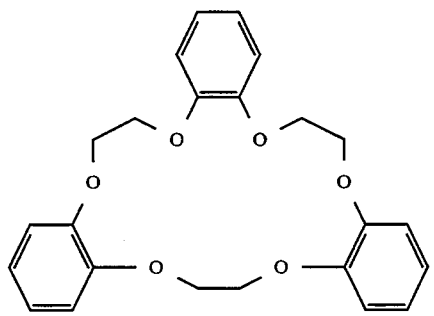
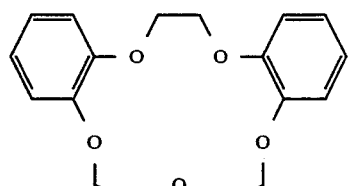
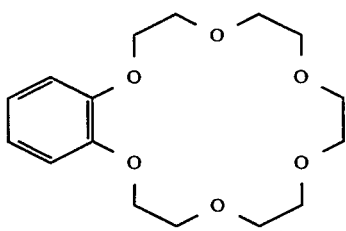
22

-continued
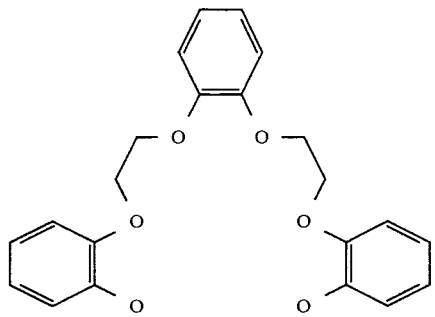 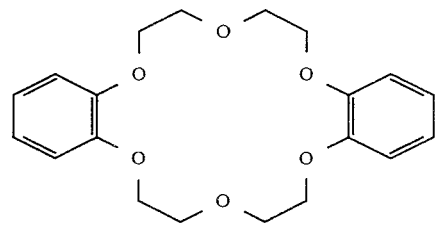
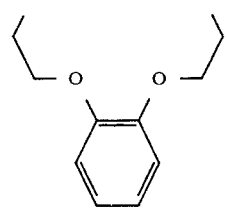
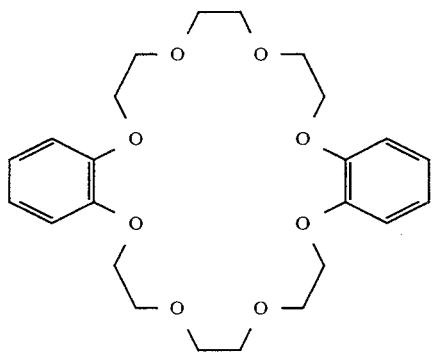 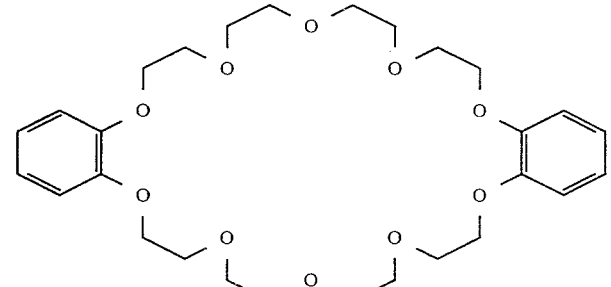
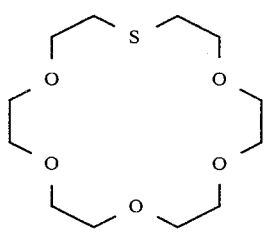 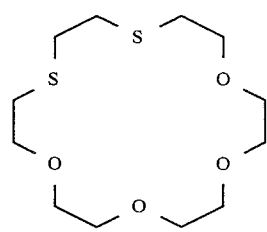 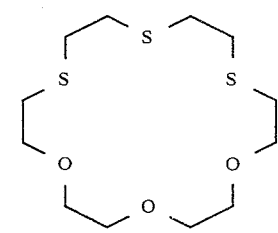
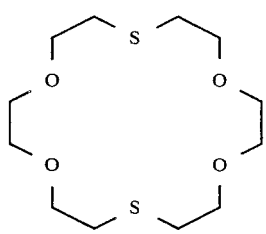 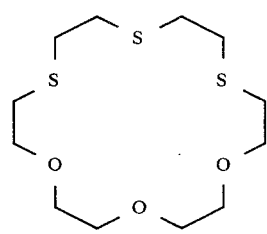 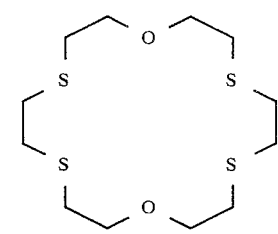

-continued
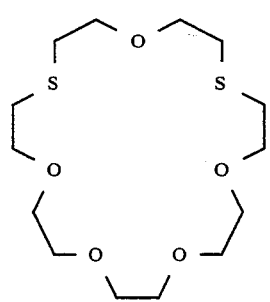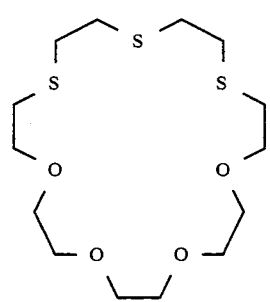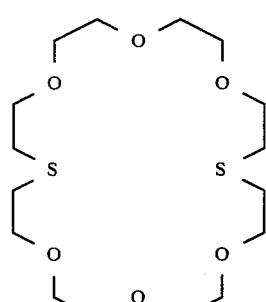
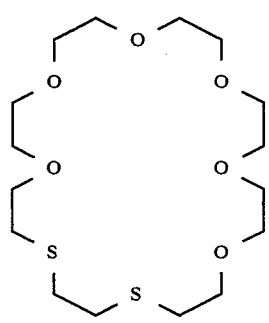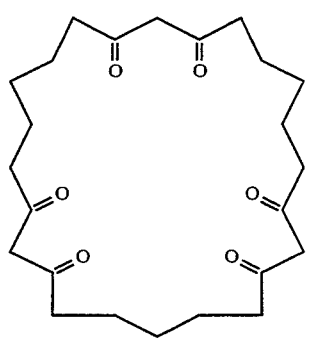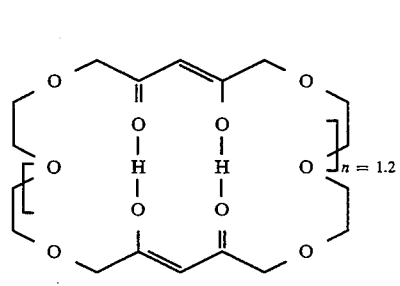
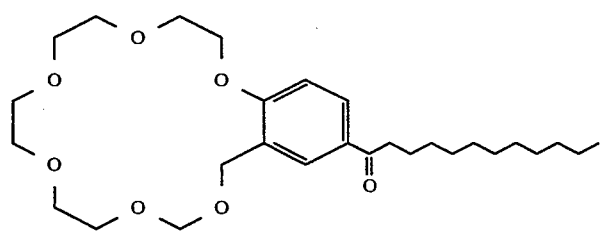
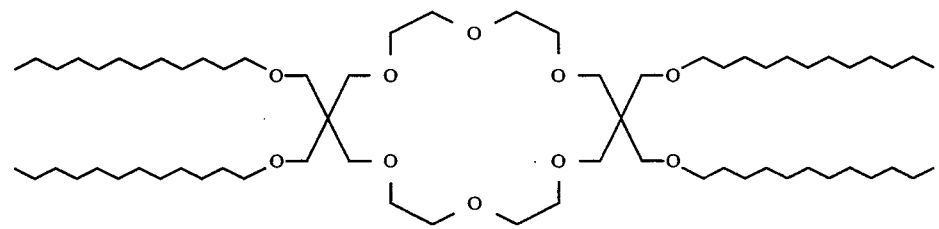
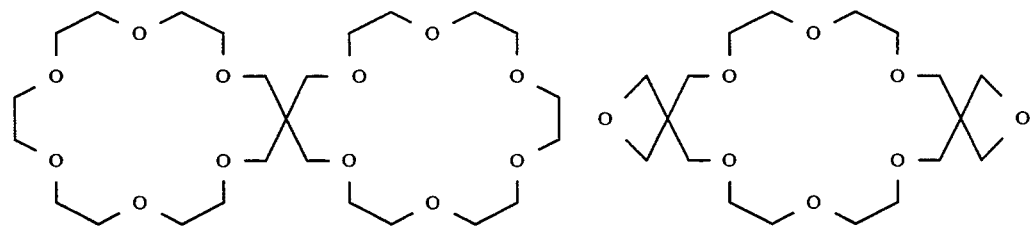
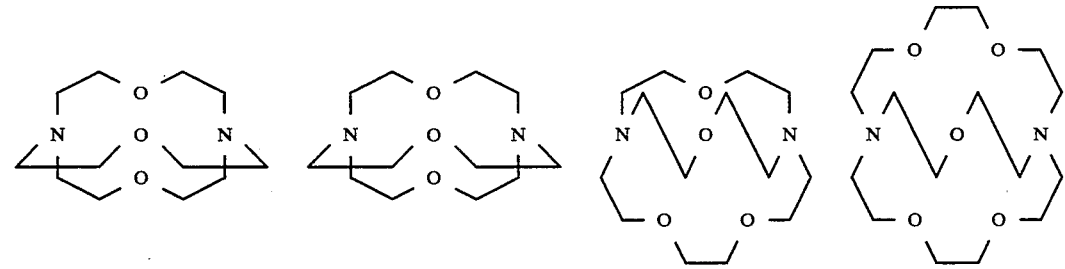

-continued
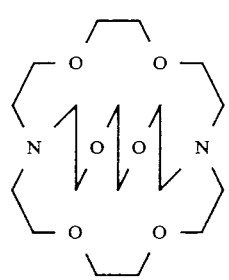 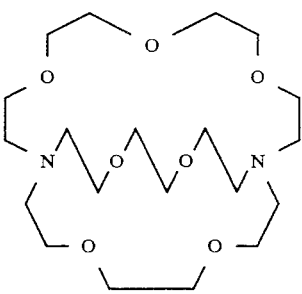 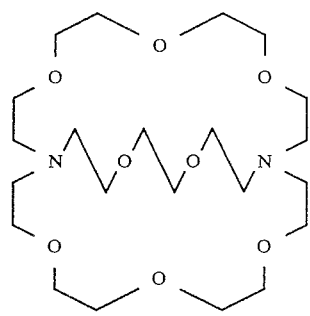
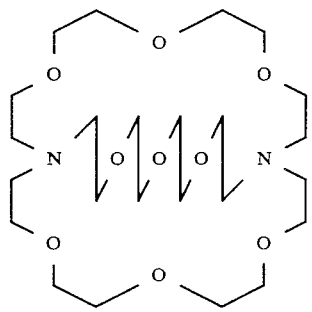 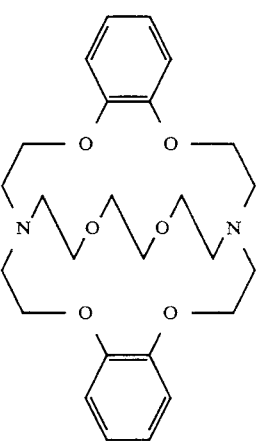 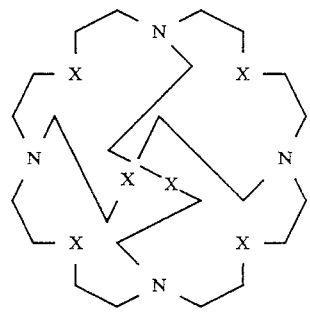
X = O
X = (CH$_2$)$_2$
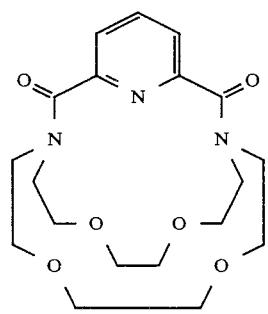 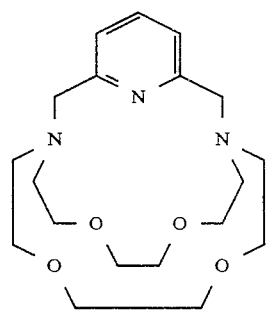
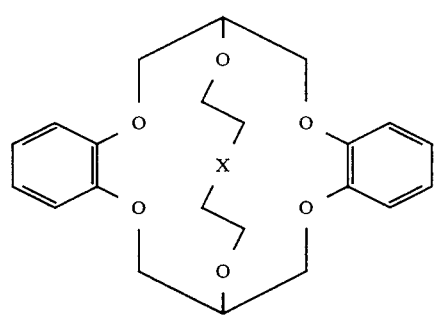
X = OCH$_2$CH$_2$O
X = (OCH$_2$CH$_2$)$_8$O
X =
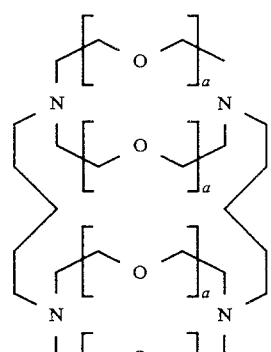
X = O; n = 1
X = O; n = 2
X = NH; n = 2
X = CH$_2$; n = 2
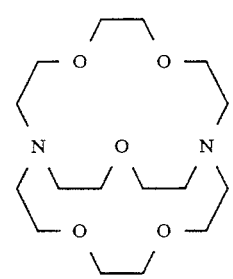

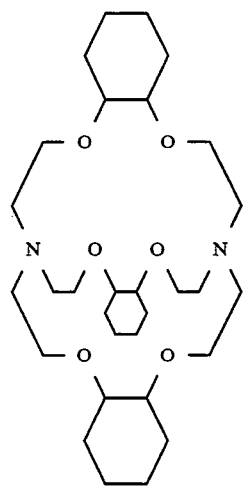
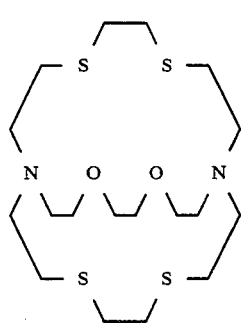
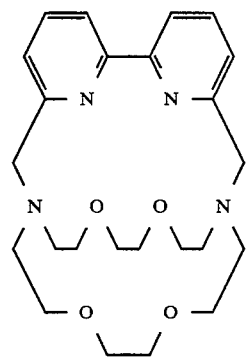
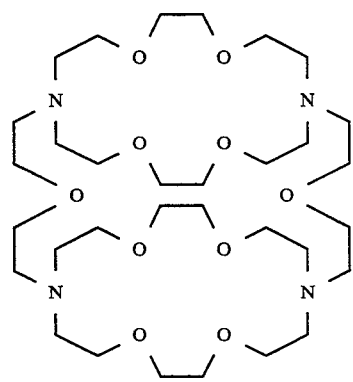
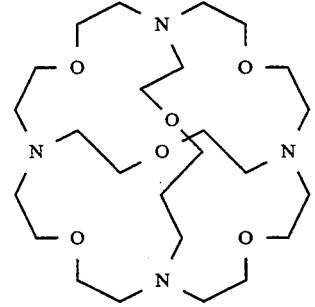
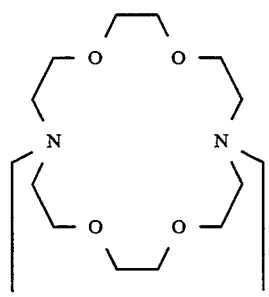
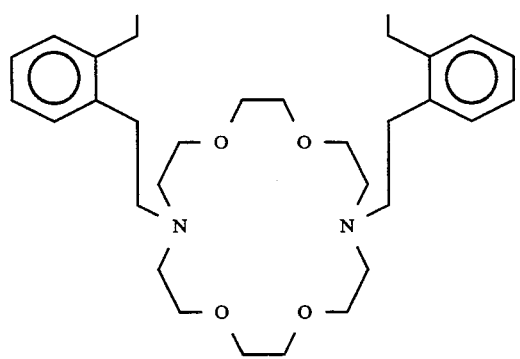

-continued
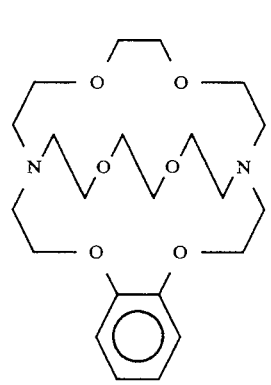
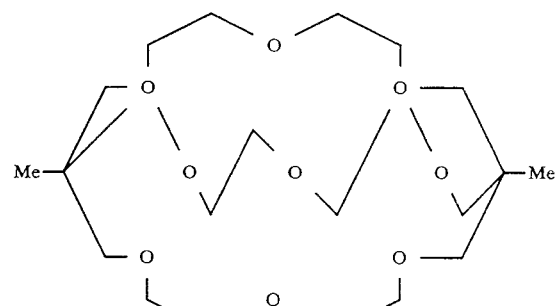
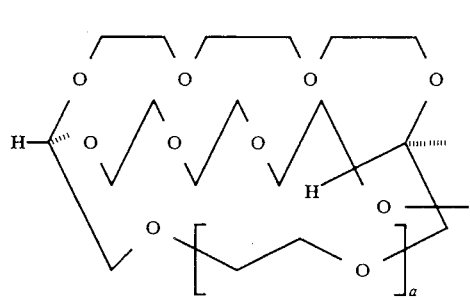  n = 2
n = 3
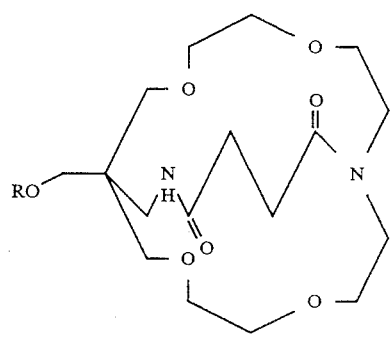
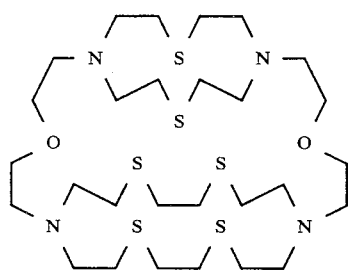
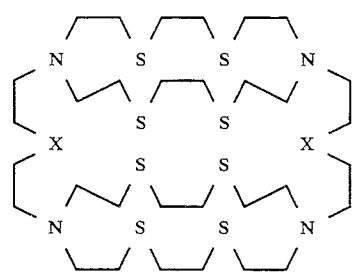
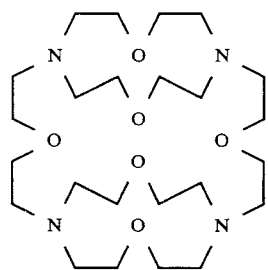
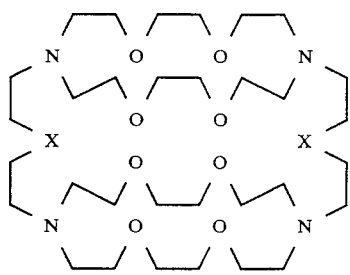
X = O
X = CH$_2$
X = o-phenylene
X = NH -continued
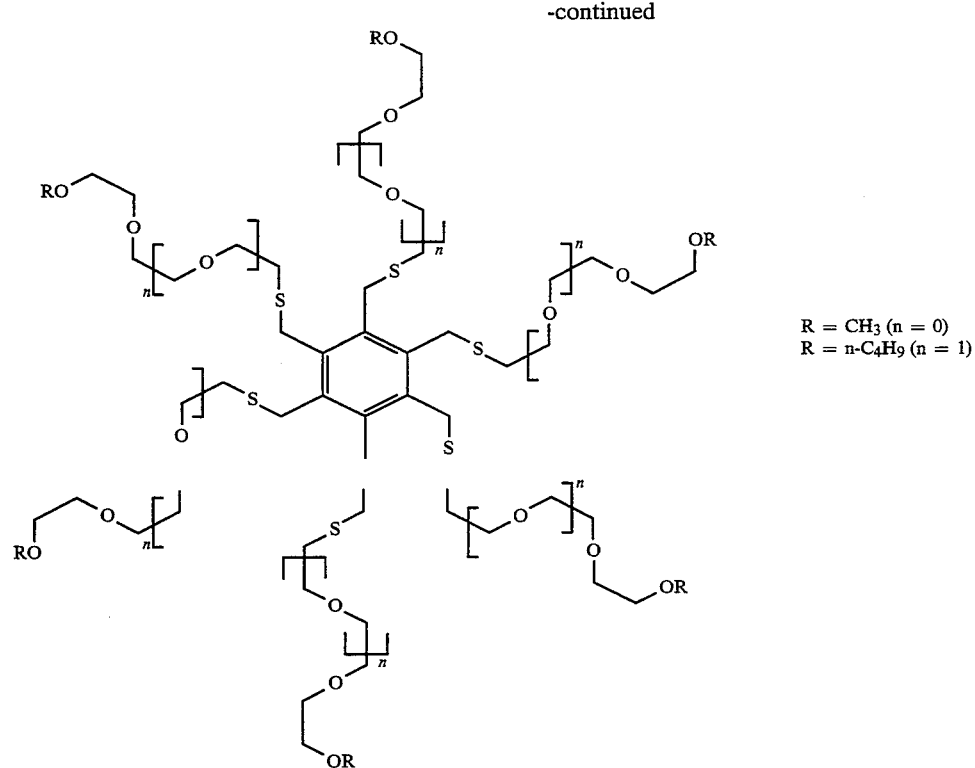
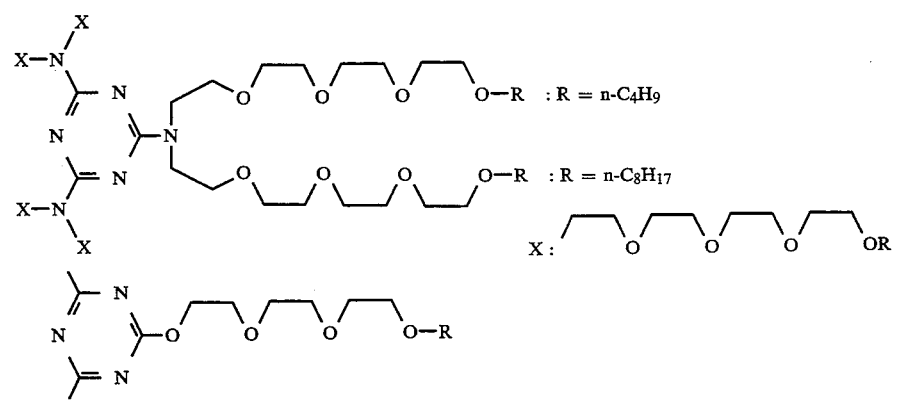
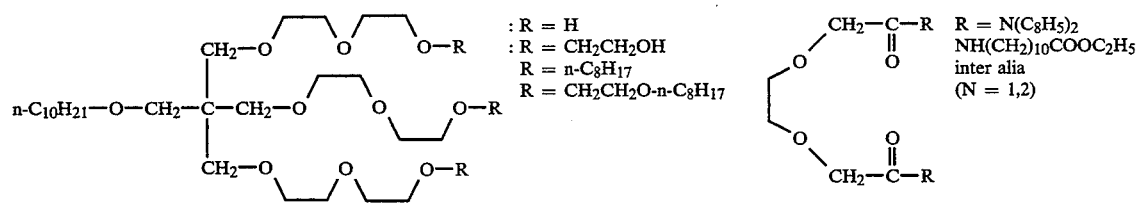
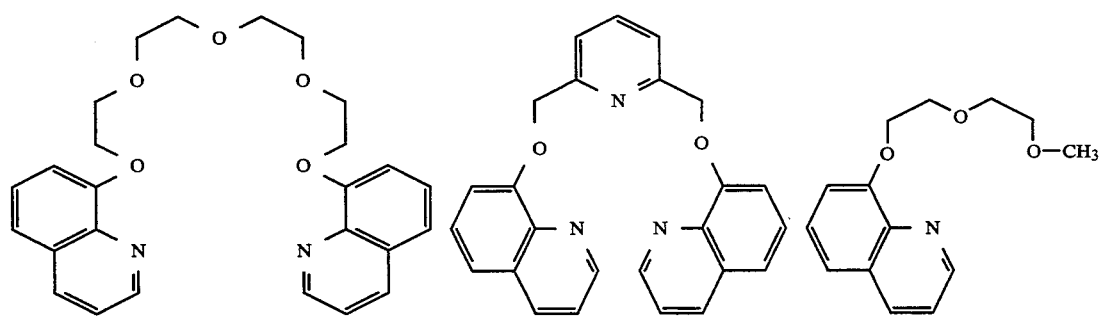

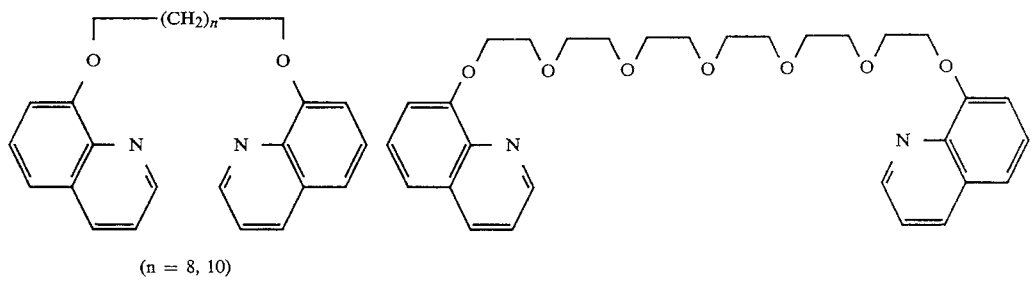
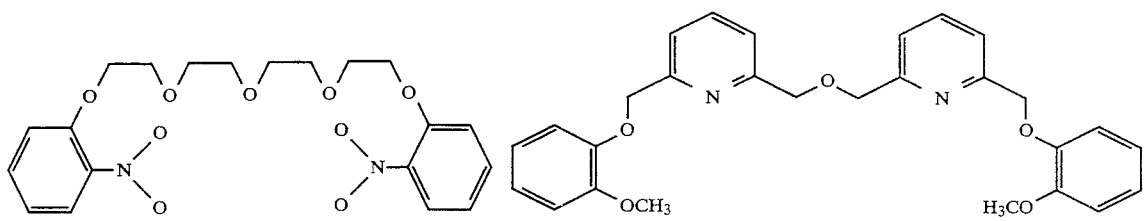
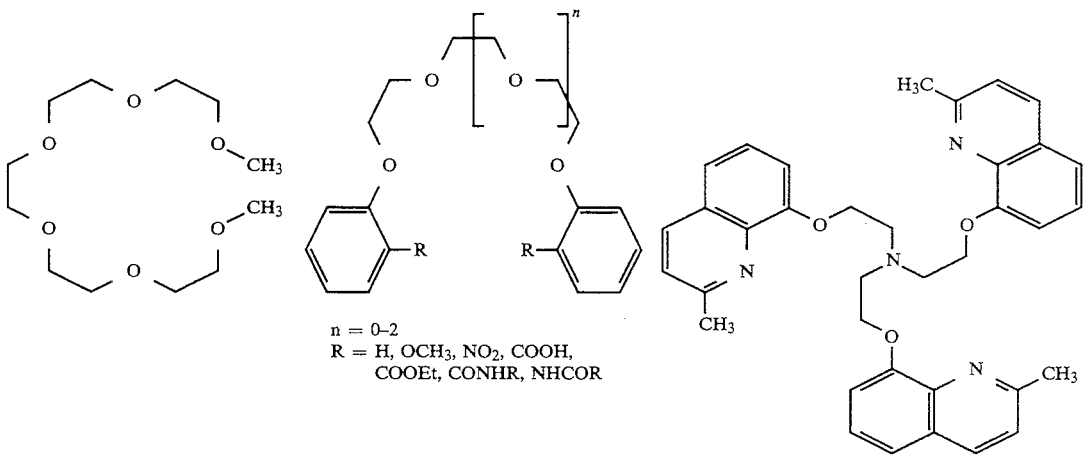
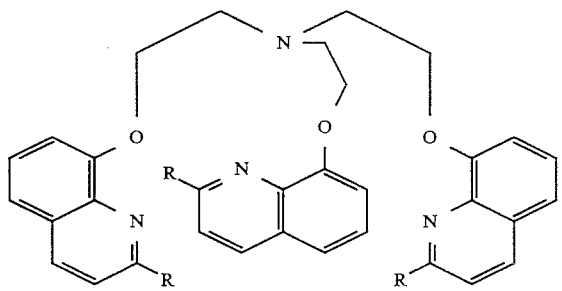
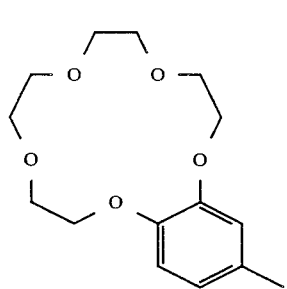
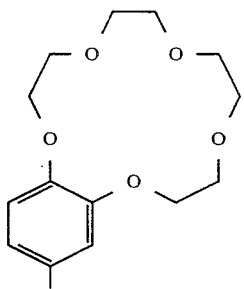

-continued

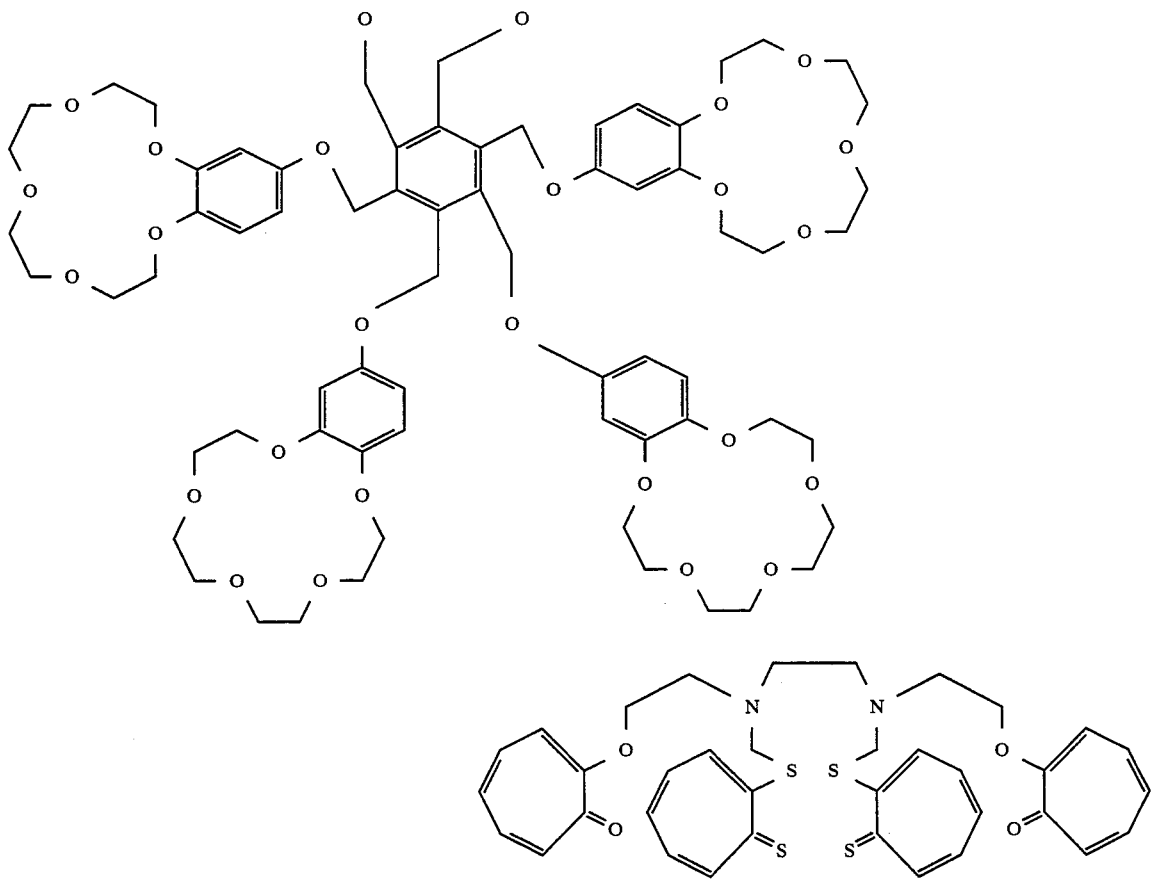

Mercapto compounds to be employed according to the invention are represented by the formula IX below:

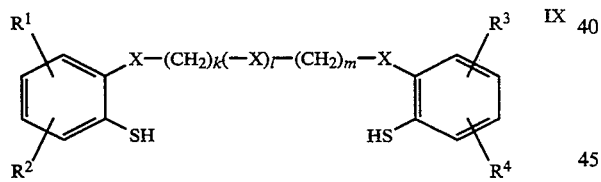

where
R$^1$, R$^2$, R$^3$ and R$^4$ independently of one another, are a hydrogen atom, alkyl having 1 to 8 carbon atoms or alkoxy having 1 to 8 carbon atoms,
—X— is —O—, —S— or —NH—,
and m, independently of one another, are 1, 2 or 3, and 1 is zero or 1.

Ionophoric compounds, as presented in DE-A 4 011 792, are also particularly suitable for increasing the contrast in displays. The ionophores are defined in greater detail by the formula X:

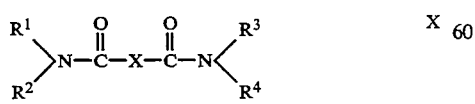

where
R$^1$, R$^2$, R$^3$ and R$^4$ independently of one another, are alkyl having 1 to 15 carbon atoms in which one —CH$_2$— group may be replaced by —COO— or —CO— or a CH$_2$— group which is not bonded directly to the nitrogen atom may be replaced by —O—, or are cyclohexyl, phenyl or benzyl, and X is alkylene having 2 to 9 carbon atoms in which one or two non-adjacent —CH$_2$— groups may be replaced by —O—, two adjacent CH$_2$— groups may be replaced by 1,2-phenylene or 1,2-cyclohexylene, two adjacent —CH$_2$— groups may be replaced by —CH(CH$_3$)—CH(CH$_3$)—, and one hydrogen atom of a CH$_2$ group may be substituted by R$^5$ or R$^6$, where R$^5$ is alkyl having 1 to 15 carbon atoms and R$^6$ is alkyl having 1 to 15 carbon atoms or CH$_2$—O—CH$_2$—CO—NR$^1$R$^2$.

In general, said compounds can be coupled to or in the alignment layer comprising the poly(hydroxystyrenes) according to the invention in the following ways:

I chemical coupling —i.e. the modifying compound is preferably bonded to/in the alignment layer via covalent bonds. The compound to be bonded on has the formula

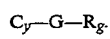

where
C$_y$ is one of the abovementioned modifying compounds;
G is a straight-chain or branched alkylene unit having 0-18 carbon atoms in which, in addition, one or more —CH$_2$— groups may be replaced by —O—, —S—

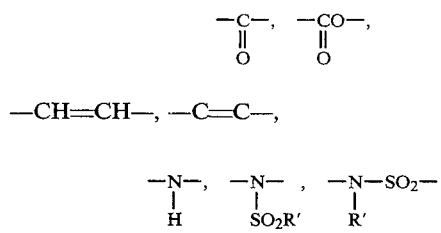

—CH=CH—, —C≡C—,

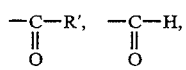

—Si(CH$_3$)$_2$—, cycloalkanediyl, arenediyl or heteroarenediyl in which, in addition, one or more hydrogen atoms of the CH$_2$ groups may be replaced by F;

R$_g$ is a reactive group (coupling functionality), for example —OH, —CO$_2$H, —CO$_2$R; —NH$_2$, —NHR', —SH,

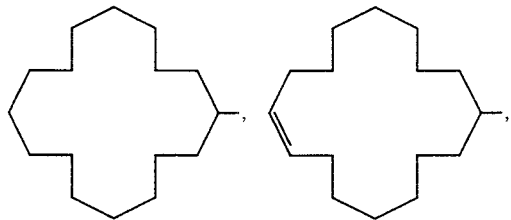

—CN —N=C=O, —N=C=S, —CH=CH$_2$, —Si(CH$_3$)$_2$Cl, Si(CH$_3$)$_2$OR', —Si(OR$_9$)$_3$, —N$_3$, halide, —N=C or SO$_2$CH=CH$_2$, R' is a straight-chain or branched alkyl group having 1 to 12 carbon atoms. Preference is given to compounds in which C$_y$ is the macrocyclic compounds, cryptands or coronands described at the outset.

Very particular preference is given to compounds in which C$_y$ has the following meaning:

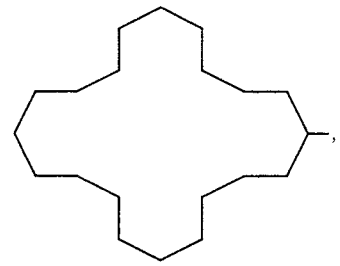

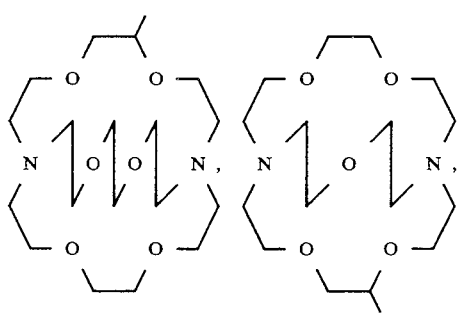

-continued

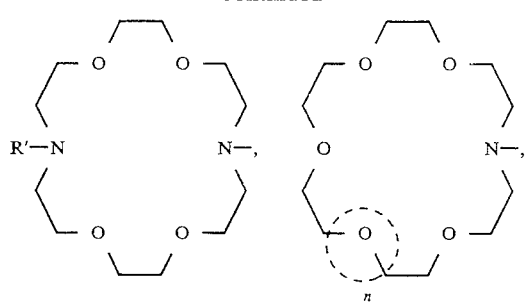

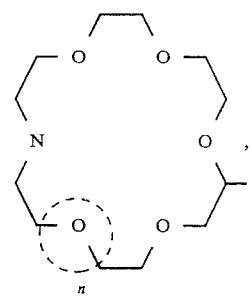

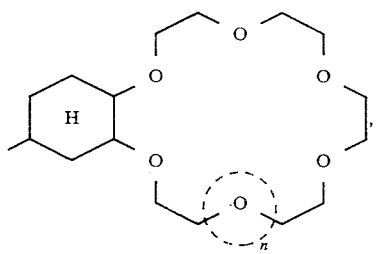

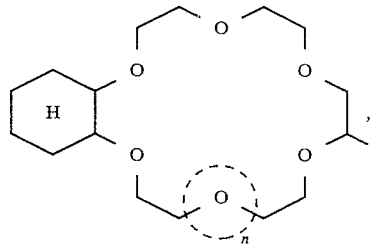

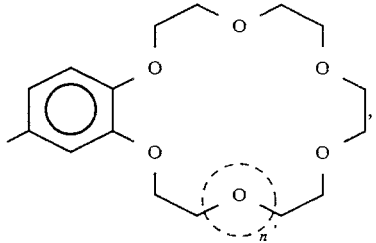

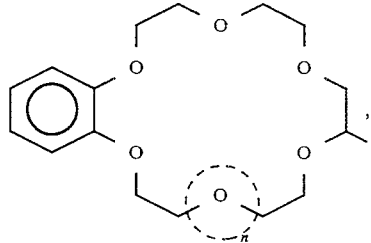

-continued

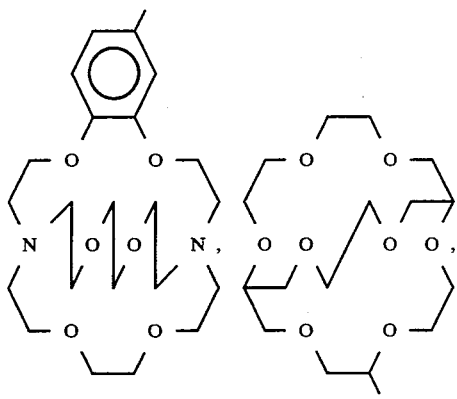

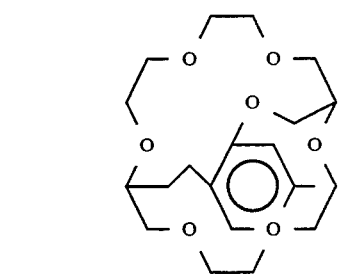

N=0, 1 or 2.
Most preference is given to compounds in which $C_y$ is

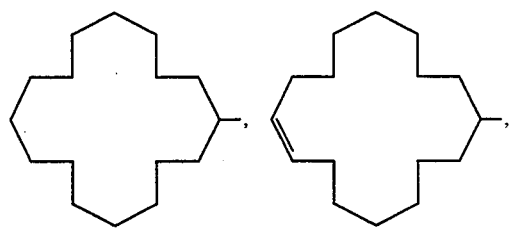

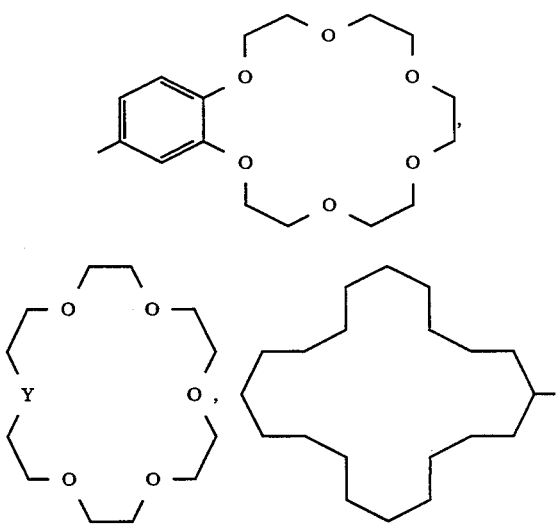

G is —O—(CH$_2$)$_m$— or —(CH$_2$)$_m$—, Y is —O— or N-alkyl or N-aryl, R$_g$ is —CO$_2$R', —N=C=O, —Si(CH$_3$)$_2$OR', —NH$_2$ or —OH, R' is a straight chain or branched alkyl group having 1 to 6 carbon atoms. The alignment layers according to the invention may contain from 0.01 to 50% by weight, in particular from 0.1 to 25% by weight, of the modifying components.

II Physisorption

The modifying compounds are adducted onto the surface of the alignment-layer molecules by relatively weak or relatively strong intermolecular attractive forces. The strength of the coupling to the surface can be increased by binding in polar or polarisable groups.

The positive effect of the modifying compounds on the alignment layer can be further reinforced by the liquid-crystal mixtures which likewise contain these compounds, in particular coronands and cryptands.

The alignment layers according to the invention are used in all types of LCDs, such as TN and STN cells; use in ferroelectric LCDs and ferroelectric light valves is preferred.

In a preferred embodiment, these FLC displays contain insulation layers for preventing short-circuits, the layer sequence being
(1) glass,
(2) ITO electrodes,
(3) insulation layer,
(4) alignment layer with additive admixed or chemically or physically bonded to the surface.

In order to suppress the surface memory effect, it may be advantageous for the electrical capacity of the insulation and alignment layers to be as high as possible (in this respect, cf. C. Escher, H. -R. Dübal, T. Harada, G. Illian, M. Murakami and D. Ohlendorf, 2nd Int. Symp. on FLCs, Gothenburg, 1989, to be published in Ferroelectrics).

For adequate insulation capacity, the thickness of the insulation layer should be at least 50–100 nm. In order to achieve sufficiently high capacities for this layer thickness, insulation layers having high dielectric constants, such as Ta$_2$O$_5$, TiO$_2$, etc., are preferably used (see also JP-A 61/170 726A, JP-A 61/078 235A, Y. Inabe, K. Katagiri, H. Inone, J. Kanbe, S. Yoshihara and S. Iijima, Ferroelectrics (1988), 85, pp. 255–264).

The invention is described in greater detail by means of the examples.

Examples

Starting materials:
a) The polymeric/oligomeric sugar compound used was one of the following commercially available substances:
1. Methylhydroxypropylcellulose ether Methyl substitution 2.08 Hydroxypropyl substitution 1.01 Viscosity (2% strength by weight in water, 25° C.; Hüppler method) 200 mPas.
2. α-Cyclodextrin (commercial product, Merck AG)
3. Ethylcellulose (Sigma GmbH) Ethoxy content: 48–49.5% (based on OH groups present) Viscosity (5% strength by weight in toluene: ethanol (4:1) at 25° C.): 45 mPas
4. Cellulose acetate (Sigma GmbH) Acetyl content about 40% (based on OH groups present)
5. Cellulose (type 20, Sigma GmbH) Mean particle size 20 μm
6. Amylose (Sigma GmbH)

b) Synthesis of Z1 1-(8-methoxycarbonyloctanoyl)-1-aza-4,7,10,13,16-pentaoxacyclooctadecane 1.00 g (2.66 mmol) of 1-aza-4,7,10,13,16-pentaoxacyclooctadecane are dissolved in 50 ml of dichloromethane. 0.6 ml of triethylamine are added, and 0.1 g of 4-dimethylaminopyridine is added as catalyst. 0.84 g (3.82 mmol) of methyl 8-(chloroformyl)octanoate is added, and the mixture is stirred at room temperature for 18 hours. The reaction solution is washed twice with 1N hydrochloric acid and twice with saturated NaHCO$_3$ solution and dried over MgSO$_4$, the solvent is stripped off, and the resultant crude product is purified by column chromatography(silica gel, dichloromethane/methanol 20:1), giving 1.40 g (82%) of Z1 as a colorless liquid.

ratio of 1:4. Temperature conditions: 20 min/60° C., 20 min/90° C., 40 min/150° C.).

| Ex. | Substance | Solvent | Concentration | Curing temp./time | Additive % by weight | Curing/time |
| --- | --- | --- | --- | --- | --- | --- |
| P1 | Methylhydroxy-propylcellulose | Millipore H$_2$O | 0.25% | 120° C./60 min | Z1 0.5% in dioxane | 120° C./30 min |
| P2 | α-cyclodextrin | Millipore H$_2$O | 2% | 180° C./90 min | Z1 0.5% in dioxane | 180° C./30 min |
| P3 | Ethylcellulose | Methyl ethyl ketone | 0.25% | 120° C./60 min | Z1 0.5% in dioxane | 120° C./30 min |
| P4 | Acetylcellulose | Methyl ethyl ketone | 0.25% | 180° C./60 min | Z1 0.5% in dioxane | 180° C./30 min |
| P5 | Cellulose | Methyl ethyl ketone | 0.25 | 180° C./60 min | Z1 0.5% in dioxane | 180° C./30 min |
| P6 | Amylose | Millipore H$_2$O | 1%/0.25 | 180° C./60 min | Z1 0.5% in dioxane | 180° C./30 min |

Construction of test cells

In order to demonstrate the advantageous properties of the alignment layers according to the invention, test cells are produced, filled with ferroelectric liquid-crystal mixtures and then tested.

To this end, glass plates coated with indium-tin oxide (ITO) are cut and treated photolithographically so that small glass substrates having an electrode area of about 8×8 mm$^2$ are formed. These glass substrates are then cleaned first in an aqueous surfactant solution and subsequently twice in Millipore water (Millipore water=demineralized water which has been substantially freed from particles by a Millepore filter unit) at about 60° C. in an ultrasound bath. After the glass substrates have been dried by means of hot air, they are coated with a wet film of a solution of the corresponding oligosaccharide/polysaccharide. The coating is carried out by means of a spin coater, but it can also be carried out by means of other methods, for example printing or immersion. The solution is dripped onto the glass substrate until it covers the latter completely and is prespun for 5 seconds at 500 rpm, after which the main spinning is carried out for 30 seconds at 4000 rpm. The wet film is dried at 180° C. for 30 minutes. The additive (Z1), dissolved in 1,4-dioxane (0.5% strength by weight), is spin-coated onto this layer, the glass substrate is heated at 180° C. for 30 minutes to bind the additive chemically to the support polymer. The excess additive is removed in an ultrasound bath by means of isopropyl alcohol. The resultant alignment layer according to the invention is then rubbed with a velvet-like material on a rubbing machine (bench speed: 100 mm/min; roller speed 500 rpm; power consumption: 0.04/cm). The 1.8 μm spacers are then applied by means of the spin coater (0.05% strength by weight solution in isopropanol; 20 sec, 2000 rpm). The adhesive frame is printed by means of a potter, and the liquid-crystal test cells are then bonded with the rubbing directions parallel using a membrane press (adhesive conditions=Epoxy304 B (5 parts)+curing agent 310 B (1 part) (both from EHC, Japan). Ethyl acetate is then added to the mixture in a The resultant test cells are investigated with respect to their electro-optical characteristics by means of various liquid-crystal mixtures.

b) Measurement examples (characterization of the alignment layers according to the invention)

In order to characterize the alignment layers according to the invention, ferroelectric liquid-crystal mixtures are used. The following are assessed: the alignment of liquid crystal in the test cell containing the alignment layer according to the invention; the switching behavior of the liquid crystal on application of short addressing pulses; the switching behavior of the liquid crystal on application of addressing pulse sequences which simulate operation of a matrix display; the optical contrast, which is the ratio between the transmissions in the bright and dark switching states.

The alignment layers according to the invention are used both in the chevron structure described at the outset and in the bookshelf or quasi-bookshelf structure. The bookshelf structure is induced from the chevron structure by application of a rectangular voltage of about 10 Hz at an amplitude of from about 10 to 15 V/μm. The cells are positioned in the ray path of a polarizing microscope to which, in addition, a photodiode is attached. The photodiode is connected to a storage oscilloscope and enables recording of the optical transmission of liquid-crystal cell.

A freely programmable function generator with subsequent voltage amplifier provides the switching pulses necessary for switching to the test cell. A very wide variety of pulse shapes can be input into the function generator via a computer interface.

The pulse shape used simulates matrix-display operation of the 1-pixel test cells employed. The line voltage/column voltage ratio (data pulses) is an important parameter which is defined as the bias ratio. This ratio should be as large as possible, since correspondingly high contrast is only possible for a low data-pulse amplitude.

The contrast is determined via the signals from the photodiode, as the ratio between the bright and dark transmissions. A distinction can further be made between the contrast of the memory states (without data pulses) and the contrast in the matrix display (with data pulses), the latter always having lower values.

A further important parameter used to characterize the alignment layer is the effective tilt angle $\theta_{eff}$. The effective tilt angle in the chevron structure is smaller than the molecular tilt angle, as a consequence of the angled layer structure.

In addition, the occurrence of twist or bend states results in a further reduction in the effective tilt angle. The bluish color observed here for the dark switching state and the low transmission in the bright state result in extremely low contrast.

The effective tilt angle in the bookshelf structure is significantly larger, and the bright state is thus distinguished by greater brightness. However, the occurrence of twist states again results in considerable losses in contrast.

The alignment layers employed should therefore substantially suppress the formation of twist states. These properties are characterized using the tilt angle in the chevron structure.

The FLC mixture M1 employed has the following composition (in mol %):

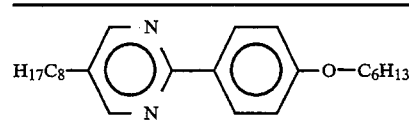 14.51

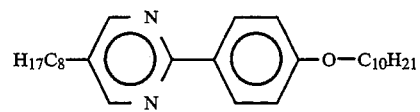 9.67

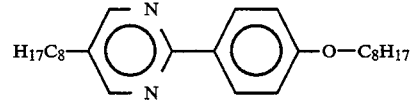 13.01

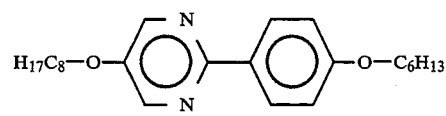 9.06

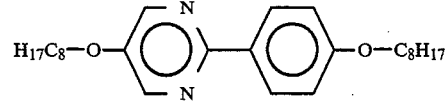 4.19

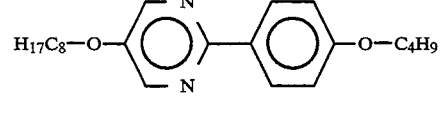 9.57

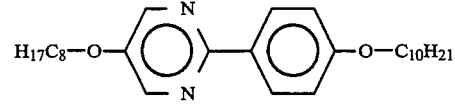 7.61

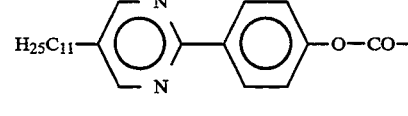 14.35

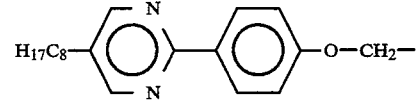 10.45

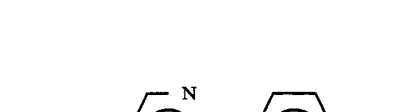 1.98

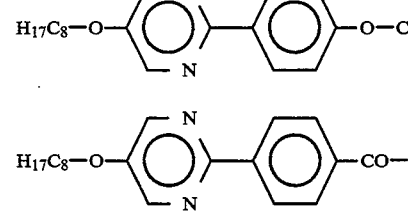 5.10

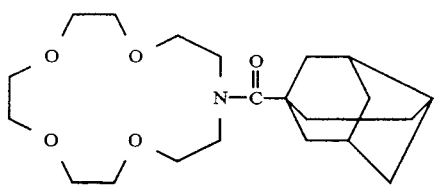

0.50 and the phase sequence $S_C^*$ 62 $S_A^*$ 70 N* 83 I, with a spontaneous polarization of 34 nC.cm$^{-2}$ at a temperature of 25° C.

Test cells containing the alignment layers P1-P6 according to the invention are filled with the ferroelectric liquid-crystal mixture M1. The results are shown in Tables 1–6.

Reference examples:

In the reference examples, self-constructed liquid-crystal cells are used which contain, as alignment layer, a surface-modified polyvinyl alcohol. These are also filled with the ferroelectric liquid-crystal mixture M1.

TABLE 1

Characterization of the alignment layer according to the invention

| M1 | Alignment layer P1 | Reference example |
|---|---|---|
| Effective tilt angle $\theta_{eff}$ (chevron structure) | 11° | 10.5° |
| Alignment of the liquid crystal | good to very good | good |
| B* max (maximum bias at a pulse width of 50 μs) | ~8 | ~7 |
| Twist states | none | none |

*Maximum possible ratio between switching pulse height and data pulse height for matrix addressing

TABLE 2

Characterization of the alignment layer according to the invention

| M1 | Alignment layer P2 | Reference example |
|---|---|---|
| Effective tilt angle $\theta_{eff}$ (chevron structure) | 11° | 10.5° |
| Alignment of the liquid crystal | good | good |
| B* max (maximum bias at a pulse width of 50 μs) | ~8 | ~7 |
| Twist states | none | none |

*Maximum possible ratio between switching pulse height and data pulse height for matrix addressing

TABLE 3

Characterization of the alignment layer according to the invention

| M1 | Alignment layer P3 | Reference example |
|---|---|---|
| Effective tilt angle $\theta_{eff}$ (chevron structure) | 11° | 10.5° |
| Alignment of the liquid crystal | good to very good | good |
| B* max (maximum bias at a pulse width of 50 μs) | ~8 | ~7 |

TABLE 3-continued

Characterization of the alignment layer according to the invention

| M1 | Alignment layer P3 | Reference example |
|---|---|---|
| Twist states | none | none |

*Maximum possible ratio between switching pulse height and data pulse height for matrix addressing

TABLE 4

Characterization of the alignment layer according to the invention

| M1 | Alignment layer P4 | Reference example |
|---|---|---|
| Effective tilt angle $\theta_{eff}$ (chevron structure) | 11° | 10.5° |
| Alignment of the liquid crystal | good | good |
| B* max (maximum bias at a pulse width of 50 μs) | ~8 | ~7 |
| Twist states | none | none |

*Maximum possible ratio between switching pulse height and data pulse height for matrix addressing

TABLE 5

Characterization of the alignment layer according to the invention

| M1 | Alignment layer P5 | Reference example |
|---|---|---|
| Effective tilt angle $\theta_{eff}$ (chevron structure) | 11° | 10.5° |
| Alignment of the liquid crystal | good | good |
| B* max (maximum bias at a pulse width of 50 μs) | ~8 | ~7 |
| Twist states | none | none |

*Maximum possible ratio between switching pulse height and data pulse height for matrix addressing

TABLE 6

Characterization of the alignment layer according to the invention

| M1 | Alignment layer P6 | Reference example |
|---|---|---|
| Effective tilt angle $\theta_{eff}$ (chevron structure) | 11° | 10.5° |
| Alignment of the liquid crystal | good | good |
| B* max (maximum bias at a pulse width of 50 μs) | ~8 | ~7 |
| Twist states | none | none |

*Maximum possible ratio between switching pulse height and data pulse height for matrix addressing

What is claimed is:

1. An alignment layer for liquid-crystal displays, comprising
   a) at least one oligomer/polymer of a 6-membered cyclic sugar unit all or some of whose free OH groups may be derivatized and which carries equatorial substituents in the 2-, 3- and 6-positions on the ring, and
   b) at least one compound from the group consisting of macrocyclic compounds, cryptands, coronands, podands, mercapto compounds and ionophores.

2. An alignment layer as claimed in claim 1, for use in ferroelectric liquid-crystal displays.

3. An alignment layer as claimed in claim 1, wherein component b is covalently bonded to component a.

4. An alignment layer as claimed in claim 1, wherein component b is bonded to component a by physical adsorption.

5. An alignment layer as claimed in claim 1, wherein component a is an oligomer/polymer of D-glucose, where all or some of the OH groups may be derivatized.

6. An alignment layer as claimed in claim 1, wherein component b is a compound of the formula $$Cy-G-R_9$$

in which Cy is:

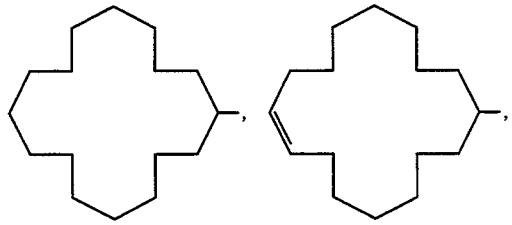

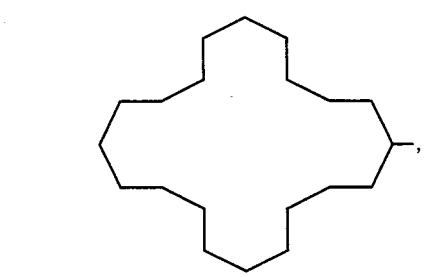

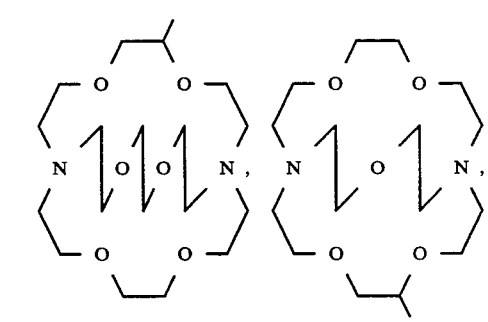

-continued

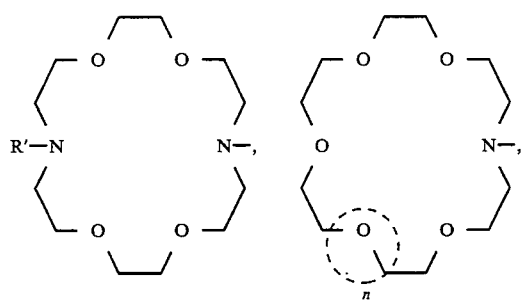

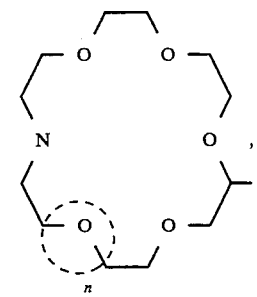

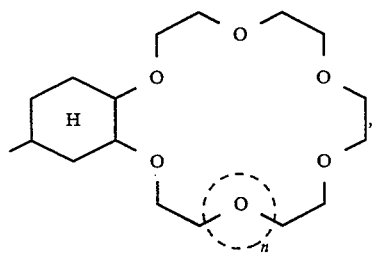

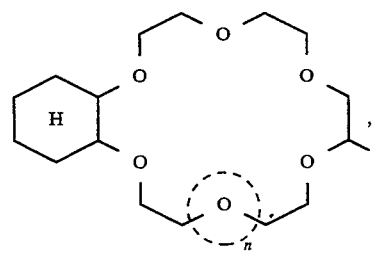

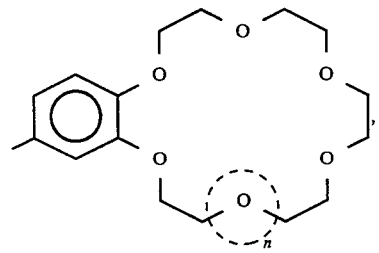

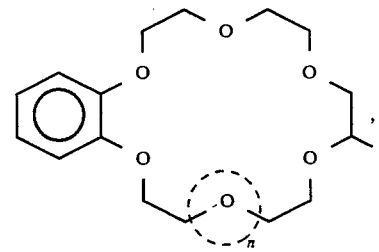

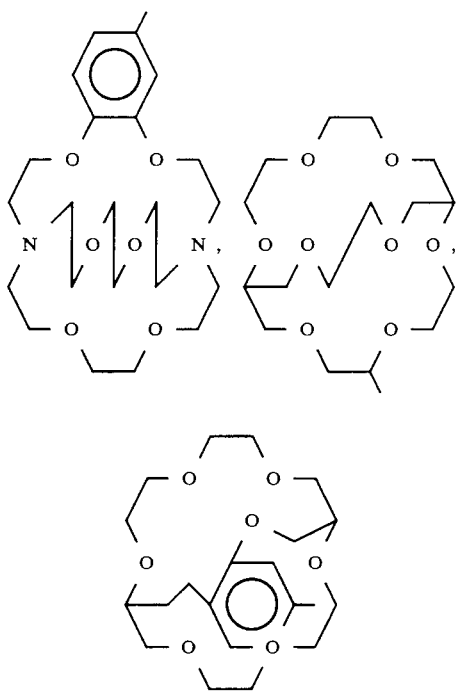

where n is 0, 1 or 2;

G is a straight-chain or branched alkylene unit having 0 to 18 carbon atoms in which, in addition, one or more —CH₂— groups may be replaced by —O—, —S—,

—Si(CH₃)₂—, or is cycloalkanediyl, arenediyl or heteroarenediyl in which, in addition, one or more hydrogen atoms of the CH₂ groups may be replaced by F; and R_g is —OH, CO₂H, —CO₂R' —NH₂, —NHR', —SH, $$\begin{matrix}-C-R',& -C-H,\\ \parallel & \parallel \\ O & O\end{matrix}$$

—CN, —N=C=O, —N=C=S, —CH=CH₂, —Si(CH₃)₂Cl, —Si(CH₃)₂OR', —Si(OR₃, —N₃, halide, —N=C and —SO₂CH=CH₂, R' is a straight-chain or branched alkyl group having 1 to 32 carbon atoms.

7. An alignment layer as claimed in claim 1, which comprises from 0.01 to 50% by weight of component b.

8. A process for the production of an alignment layer as claimed in claim 1, which comprises 1. dissolving at least one oligomer/polymer of a 6-membered cyclic sugar unit some or all of whose free OH groups may be derivatized and which carries equatorial substituents in the 2-, 3- and 6-positions of the ring, in water or a suitable organic solvent, giving a 0.1–5% strength by weight solution, 2. applying this solution to an ITO-coated glass substrate by means of a spin coater, 3. drying the glass substrate at a temperature of 80°–250° C., 4. applying a 0.1–5% strength by weight solution of at least one compound from the group consisting of macrocyclic compounds, cryptands, coronands, podands, mercapto compounds and ionophores in a suitable organic solvent to the precoated substrate by means of a spin coater, 5. heating the coated substrate to a temperature between 80° C. and 250° C., 6. rubbing the resultant modified alignment layer after cooling.

9. A liquid-crystal display comprising at least one alignment layer as claimed in claim 1.

* * * * *